C. FRECH.
VALVE FOR BLOWING ENGINES AND THE LIKE.
APPLICATION FILED APR. 2, 1919.
1,326,923.
Patented Jan. 6, 1920.
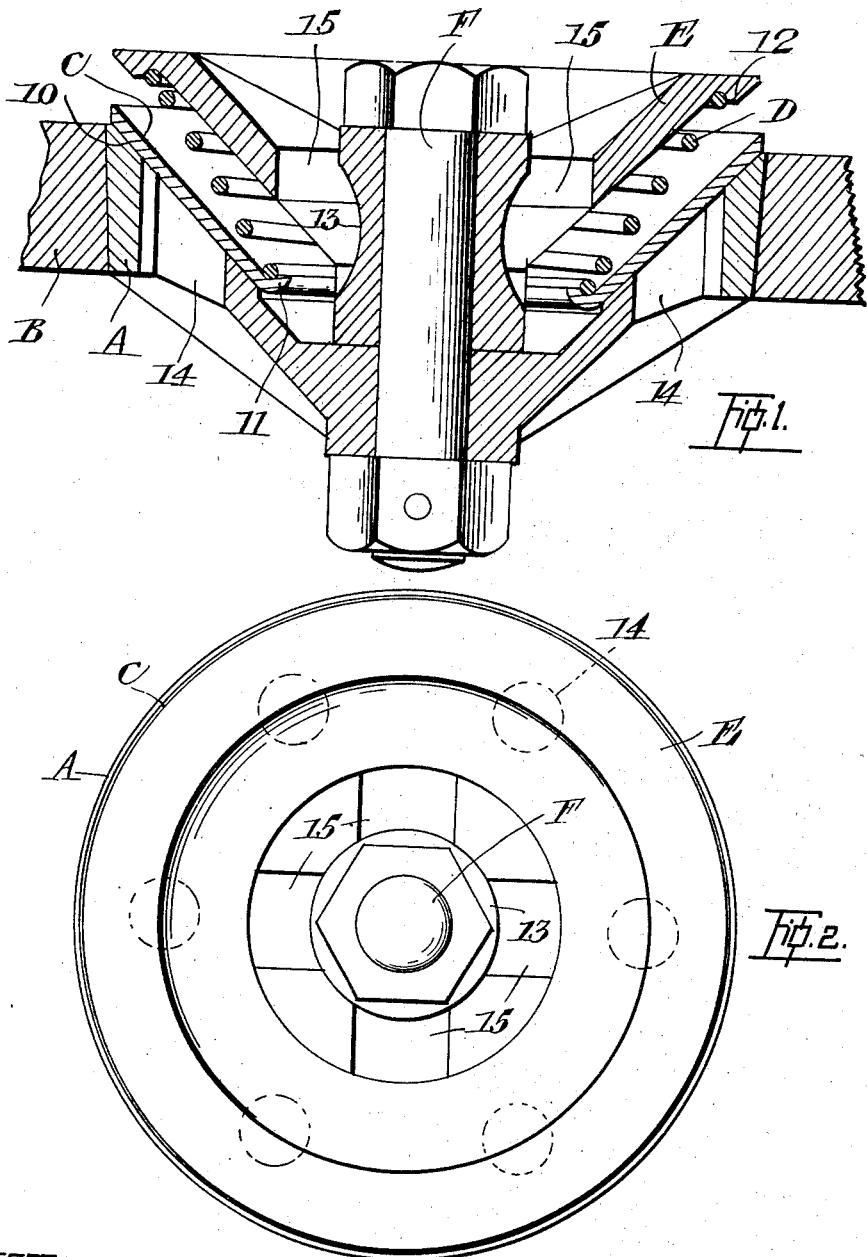
WITNESSES
INVENTOR
CHARLES FRECH
BY Featherstonhaugh & Co
ATTYS

UNITED STATES PATENT OFFICE.

CHARLES FRECH, OF SAULT STE. MARIE, ONTARIO, CANADA.

VALVE FOR BLOWING-ENGINES AND THE LIKE.

1,326,923.

Specification of Letters Patent.

Patented Jan. 6, 1920.

Application filed April 2, 1919. Serial No. 286,881.

*To all whom it may concern:*

Be it known that I, CHARLES FRECH, a subject of the King of Great Britain, and resident of Sault Ste. Marie, in the Province of Ontario, Dominion of Canada, have invented certain new and useful Improvements in Valves for Blowing-Engines and the like, of which the following is a specification.

This invention relates to valves for blowing engines and the like, and particularly to intake or discharge valves used on blowing engines, air compressors, pumps or similar machines in which air, gases, water or similar fluids are caused to flow in one direction, and checked from flowing back by the valve.

The general objects of the invention are to provide a simple and effective valve of this character, which is compact, relatively light in weight, consistent with durability, easily taken out for cleaning and readily assembled into existing operating machines or incorporated into new designs.

Further objects are to generally improve and simplify the construction of the various parts of the valve to better adapt them to perform the functions required of them, and it consists essentially of the improved construction hereinafter described in detail in the accompanying specification and drawings.

In the drawings:—

Figure 1 is a cross section of the center of the valve.

Fig. 2 is a plan view.

Referring to the drawings, A represents the valve seat suitably held in a support B of any desired character and corresponding with the position in which the valve is used.

C represents the valve conical in form and fitting closely to the valve seat which is provided with a corresponding tapered or conical surface 10, the central smaller end of the valve B being formed with a curved flange 11 which receives and holds the end of a spiral compression spring D, the turns of which are gradually enlarged in diameter in an axial direction away from the flange 11, the outer end of the compression spring or that remote from the flange 11 being engaged with a retaining flange 12 formed on a follower member E which is also conical in form and fixedly held in position by means of a bolt F which extends through the follower member and through the central part of the valve seat, the follower member being formed with a central cylindrical projection 13 having relatively extending bearing on the bolt.

The valve seat A is formed with a plurality of ports 14 adapted normally to be closed by the valve C, the follower member E may also be formed with a plurality of ports 15 to permit the free discharge of liquid when the valve C is in open position.

It will be seen that the valve C is normally held closed under spring compression but will open in one direction when a sufficient pressure is against it and when open being formed without guide it is free to float and thus adjust itself automatically in closing against the conical surface of the seat A.

As many changes could be made in the above construction, and many apparently widely different embodiments of my invention, within the scope of the claims, constructed without departing from the spirit or scope thereof, it is intended that all matter contained in the above specification and accompanying drawings shall be interpreted as illustrative and not in a limiting sense.

What I claim as my invention is:—

1. In a valve of the character described and in combination a valve seat having a port therein formed with a conical seating surface, a conical valve member, a conical follower member supported from the valve seat and spaced therefrom, and a spiral spring extending from the follower member to the valve member.

2. In a valve of the character described and in combination a valve seat having a port therein formed with a conical seating surface, a conical valve member, a follower member supported from the valve seat and spaced therefrom, and a spiral spring extending from the follower member to the valve member, the said follower member being formed with a plurality of ports therein.

3. In a valve of the character described and in combination a valve seat having a port therein formed with a conical seating surface, a conical valve member, a concentrically arranged conical follower member supported from the valve seat and spaced therefrom, and a spiral spring extending from the follower member to the valve member, and a bolt forming a connection between the follower member and the valve seat.

4. In a valve for the purpose specified and in combination, a valve seat having a port and formed with a tapered seating surface, a conical valve adapted to fit the seat and formed with a turn flange at the smaller end, a conical follower member formed with a retaining flange, a spiral spring extending between the flange on the valve and follower member respectively, and a bolt connecting the follower member and the valve seat.

5. In a valve for the purpose specified and in combination, a valve seat having a port and formed with a tapered seating surface, a conical valve adapted to fit the seat and formed with a turn flange at the smaller end, a conical follower member formed with a retaining flange, a spiral spring extending between the flange on the valve and follower member respectively, and a bolt connecting the follower member and the valve seat, the said follower member being formed with a cylindrical projection embracing the bolt.

In witness whereof I have hereunto set my hand in the presence of two witnesses.

CHARLES FRECH.

Witnesses:
RHEA KAUPP,
W. W. HARE.